Aug. 9, 1927.
J. B. BOYETT
1,638,758
PLANT SPRAYING APPARATUS
Filed May 20, 1924   2 Sheets-Sheet 1
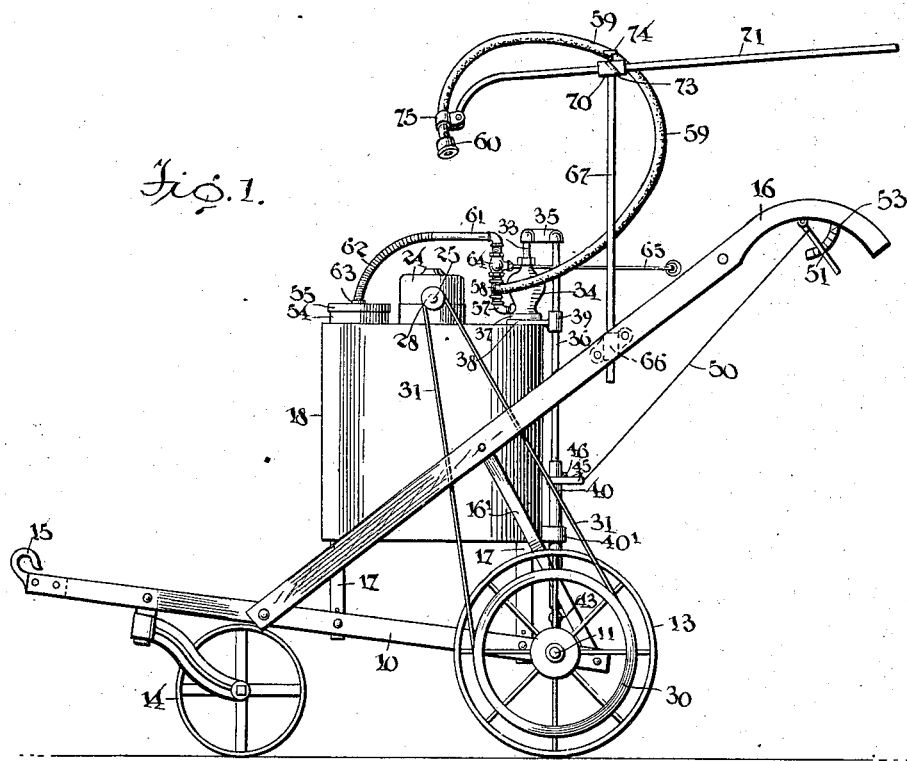
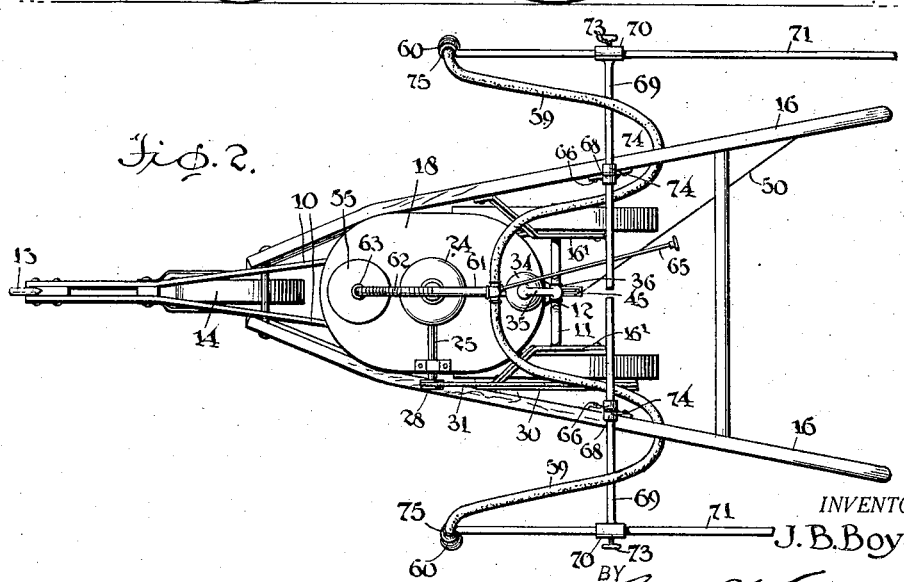
INVENTOR.
J. B. Boyett,
BY
Geo. P. Kimmel
ATTORNEY.

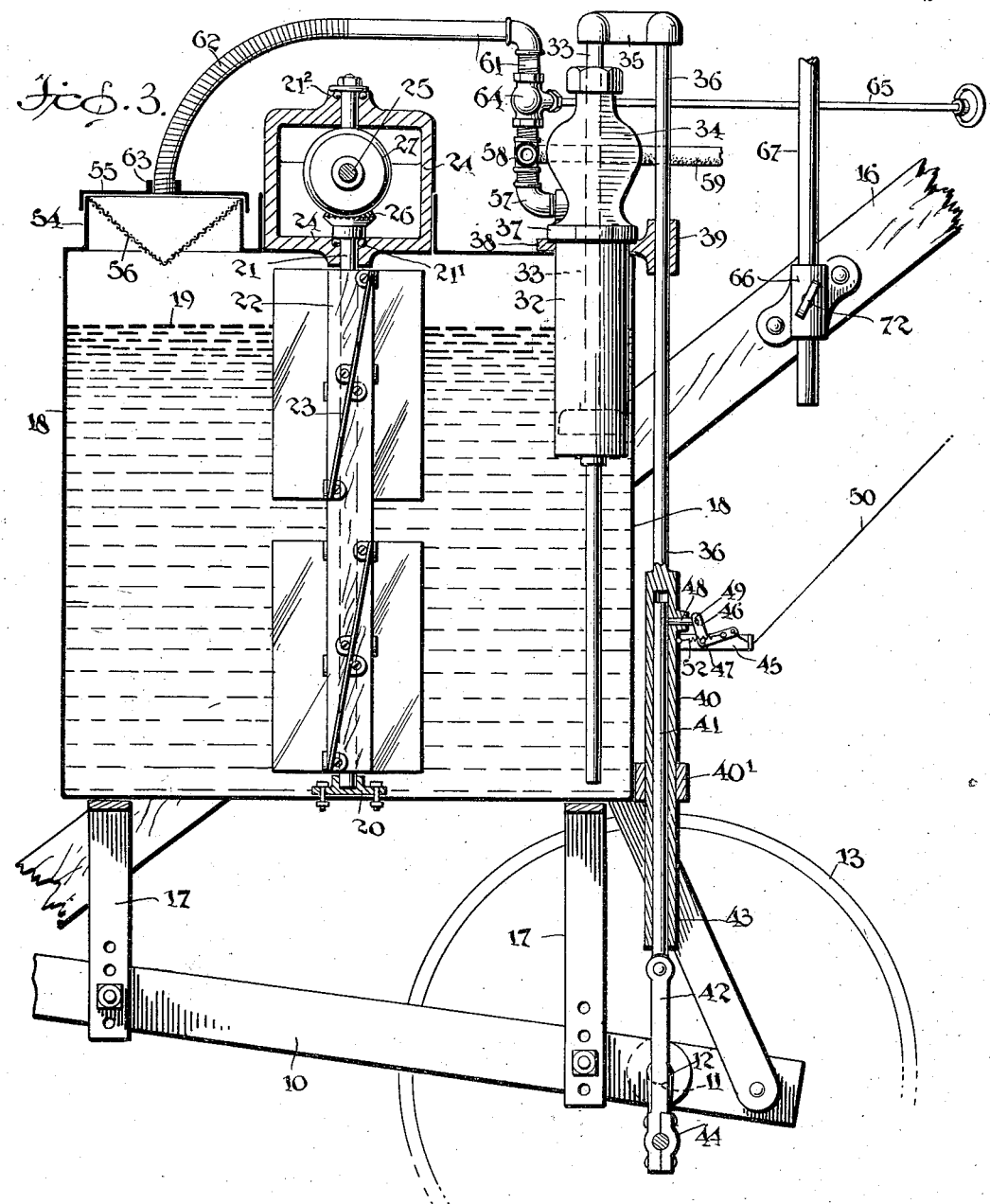

Patented Aug. 9, 1927.

1,638,758

UNITED STATES PATENT OFFICE.

JESSE B. BOYETT, OF TAMPA, FLORIDA.

PLANT-SPRAYING APPARATUS.

Application filed May 20, 1924. Serial No. 714,616.

This invention relates to apparatus for spraying plants of various kinds to destroy noxious insects and the like, and has for one of its objects to improve the construction and increase the efficiency and utility of devices of this character by providing a thorough mixing of the constituents of the spraying liquid to form a uniform mixture to prevent burning of the plants when sprayed and further to overcome the accumulation of solid matter at the intake of the pump element of the apparatus.

Another object of the invention is to provide a device of this character, including a tank for a spraying liquid, means for discharging the liquid from the tank through spraying conductors, and means for returning the surplus liquid supplied to the spraying conductors during the spraying operation, or when an increased agitation is desirable.

Another object of the invention is to provide a device of this character, including a supporting frame mounted on an axle and carrier wheels, a tank for a spraying liquid mounted on the frame, means operative from the axle for discharging the liquid from the tank through spraying conductors, means for turning the liquid from the discharging means back into the tank, and means operative from the axle for agitating the liquid in the tank.

With these and other objects in view the invention consists in certain novel features of construction as hereinafter shown and described and then specifically pointed out in the claims, and in the drawings illustrative of the preferred embodiment of the invention—

Figure 1 is a side elevation, and

Figure 2 is a plan view, of the improved apparatus.

Figure 3 is an enlarged vertical section of the operative portions of the apparatus.

The improved apparatus comprises a supporting frame including spaced side rails 10 supporting an axle 11 having a crank 12 near the rear, the axle also supporting carrier wheels 13, and the frame supporting a forward caster wheel 14.

The frame members 10 also support a draft appliance 15, at the forward end, and rearwardly directed guide handles 16, the latter braced as at 16′.

Supported in any suitable manner from the frame members 10, for instance by brackets 17, is a tank or reservoir 18 for the spraying liquid, indicated at 19.

Stepped at 20 on the bottom of the tank 18 centrally thereof, is a vertical shaft 21 having a square member 22 thereon, the latter carrying a plurality of spaced, superposed sets of upstanding agitator blades 23, preferably arranged obliquely to the longitudinal axis of the members. The sets of agitator blades, when revolving, provide for a thorough mixing of the constituents of the spraying liquid to form a uniform mixture to prevent burning of the plants when sprayed and further overcoming the accumulation of solid matter at the inlet of a pump to be presently referred to. Each agitator blade is radially disposed and inclines from its top to its bottom edge throughout in a direction across the axis of the shaft 21.

The shaft 21 extends into a housing 24 above the tank 18, and is provided with a bevel gear 26 within the housing. A counter shaft 25 is mounted for rotation through the housing 24, and is provided with a bevel gear 27 engaging the gear 26 and with a belt pulley 28 externally of the housing. Mounted on the axle 11 is a belt pulley 30, an endless belt 31 operating over the pulleys 28 and 30, and thus transmits the motion of the axle 11 to the counter shaft 25 and the agitators 23 operative thereby, as the machine is moved forwardly.

Supported in the top of the tank 10 is a pump cylinder 32 having a plunger, indicated at 32′ and a pump rod indicated at 33. At its upper end the pump element is provided with an air chamber 34, with the pump rod 33 extending through the air chamber and coupled at 35 to a downwardly directed operating rod 36.

The coupling 37 between the pump cylinder 32 and the air chamber 34 rests upon a supporting bracket 38 having a guide sleeve or collar 39 for the rod 36.

At its lower end the rod 36 terminates in a guide sleeve 40, the latter supported for vertical movement through a guide collar 40′ attached to the tank 18.

A coupling rod in two sections 41 and 42 united by a joint 43, is coupled by one portion at 44 to the crank 12 of the axle 11, and is movably engaged by the other portion in the sleeve 40.

Extending from the sleeve 40 is a bracket 45 in which a bell crank lever 46 is pivoted at 47 at its elbow.

A lock bolt 48 is connected at 49 to one arm of the lever 46 and operates through the adjacent side of the sleeve 40 and into a seat in the rod section 41 when the latter is in its upper position, as shown in Figure 3.

A pull cord 50 leads from the other arm of the lever 46 to a pull lever 51 convenient to the hand of the operator where he grasps one of the handles 16, as shown in Figure 1. A spring indicated at 52 is coupled to the crank arm 46, to hold the same in retracted position, to retain the bolt 48 yieldably in locking position relative to the rod section 41, and return it to locking position when released.

Some means are provided for holding the pull lever 51 in withdrawn position against the resistance of the spring 52, for instance a catch device 53.

By this arrangement, so long as the pull cord 50 is released from strain by the pull lever 51, the bolt 48 will lock the rod section 41 to the sleeve 40, so that they move in unison, and thus operate the pump, when the machine is moved over the ground.

When it is desired to move the machine from place to place, or when the operation of the pump is not required, it is only necessary to draw the pull lever 51 rearwardly until engaged by the catch 53, which movement will hold the bolt 48 withdrawn from the path of the rod section 41, and permit the latter to be moved in the sleeve 40 by the continued action of the crank in the axle, but without effecting the operation of the pump.

The pump may thus be disconnected when not required.

Connected to the upper side of the tank and communicating therewith, is a small receiver 54 having a removable cover 55 and a screen diaphragm 56, the latter preferably conical, as shown in Figure 3.

The discharge of the pump is represented at 57, and connected at 58 to the discharge are laterally directed flexible conductor members 59 each terminating in a discharge or spray nozzle 60. The conductors 59 are of hose material of any preferred quality or size or of any required length.

Leading upwardly from the coupling 58 is a branch 61 from which a hose conductor 62 leads, and is coupled at 63 through the cover 55 of the receiver 54.

A controlling valve 64 is coupled into the branch 61 and operative by a rod 65 leading to a point convenient to the operator. The branch 61 and conductor 62 provides for the return of surplus liquid supplied to the conductors during the spraying operation. The return is had when the valve 64 is opened.

By this arrangement when it is required to utilize the spraying conductors, the valve 64 is closed, when the contents of the tank will be forced through the nozzles 60, and none will pass through the branch 61—62.

If the spraying operation is not required or if a more thorough mixing of the ingredients of the liquid is desired, the valve 64 is opened, when the contents of the tank, which will naturally seek the path of least resistance, will be caused to flow through the branch 61—62 and back into the tank through the receiver 54 by the action of the pump.

Attached to the handle members 16 are brackets 66, and supported in each bracket is a standard 67 each having a sleeve 68 at the upper end. Slidable horizontally through each of the latter sleeves is a rod 69 having a guide sleeve 70 at the outer end each to adjustably receive another rod 71.

The brackets 66 are provided respectively with set screws 72, while the sleeves 68 and 70 are provided with like set screws 73 and 74, to control the positions of the various rods.

At their forward ends the rods 71 are curved and provided with coupling devices indicated at 75, to connect the conductor members 59 to the rods.

By this arrangement the nozzles 60 may be adjusted to any required position, to correspond to the position and size of the plants to be sprayed.

The shaft 21 is provided with ball bearings, indicated at 21' and 21², where it passes through the housing 24.

The improved apparatus is simple in construction, can be manufactured of any required material, and any required capacity.

The improved device may be employed for spraying plants of various kinds but is more particularly adapted for treating cotton plants, potato plants and the like, but it is not desired to limit the device for use in connection with any particular plants.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:

1. An apparatus for spraying plants comprising a tank for containing a spraying liquid, a pump element having its inlet within the tank and including an air chamber adapted to be coupled with a spray nozzle whereby a uniform spray is produced, in combination with a revoluble shaft arranged centrally of and extending from the top to the bottom of the tank, upstanding, spaced sets of agitators arranged in superposed relation and fixed to and bodily revoluble with said shaft whereby a thorough mixing of the constituents of the liquid is had to prevent burning of the plants when sprayed and accumulation of solid matter at said inlet is prevented, each of the agitators of each set inclining throughout across the axis of the shaft.

2. An apparatus for spraying plants comprising a tank for containing a spraying liquid, a pump cylinder supported from the top of the tank and having its inlet within the latter, an air chamber at the top of and opening into the cylinder and providing for a uniform spraying of the liquid, a piston operating in the cylinder, a piston rod connected to the piston and extending through said chamber, means for reciprocating said rod, an outlet conductor leading from said chamber and adapted to be attached to a spraying device, a surplus liquid conducting branch leading from said conductor to the tank, and a controlling valve in said branch, in combination with a revoluble shaft arranged centrally of and extending from the top to the bottom of the tank, upstanding, spaced sets of agitators arranged in superposed relation and fixed to and bodily revoluble with said shaft whereby a thorough mixing of the constituents of the liquid is had to prevent burning of the plants when sprayed and accumulation of solid matter at said inlet is prevented, each of the agitators of each set inclining throughout across the axis of the shaft.

In testimony whereof, I affix my signature hereto.

JESSE B. BOYETT.